United States Patent [19]
Meek et al.

[11] 3,744,151
[45] July 10, 1973

[54] EDUCATIONAL TOY
[76] Inventors: John S. Meek, 14 Outrigger St., Venice, Calif.; J. Roy Nelson, 8741 Shoreham Drive, Los Angeles, Calif. 90069
[22] Filed: May 1, 1972
[21] Appl. No.: 249,088

[52] U.S. Cl. .............. 35/19 R, 73/356, 116/114.5, 272/8 N
[51] Int. Cl. ........................................ G09b 23/16
[58] Field of Search ...................... 35/19 R; 62/383; 73/356, 358, 362.8; 116/114.5; 161/410; 272/8 N

[56] References Cited
UNITED STATES PATENTS
1,587,399 6/1926 Moler.................................. 35/19 R
2,272,245 2/1942 Kuck................................... 35/19 R
3,324,723 6/1967 Ritchie................................ 73/358

Primary Examiner—Harland S. Skogquist
Attorney—Charles G. Lyon et al.

[57] ABSTRACT

An educational toy comprising a closed container filled with a liquid having a freezing point generally below room temperature and a metal rod extending into the container and outwardly therefrom through a heat insulating material and into a second open container. Upon placing an ice cube about the end of the rod in the open container, crystallization is seen to occur about the opposite end of the rod within the closed container due to the freezing of the liquid about the rod, thereby giving the effect of transfering the ice cube from one container to the other.

26 Claims, 5 Drawing Figures

PATENTED JUL 10 1973 3,744,151

EDUCATIONAL TOY

BACKGROUND OF THE INVENTION

It is a common experience that scientific principals are more easily learned and understood through visual experience than impersonal readings. It is for this reason that most science classes taught in school have laboratory experiments connected therewith. Sometimes these scientific principals can be applied and illustrated to obtain novelty effects. Such effects naturally arouse ones curosity as to exactly what is occurring and why. This aroused inquisitiveness combined with the proper explanation results in a quicker and more thorough understanding of the scientific principals involved. The teaching level of novelty effects depends, of course, on the principlas involved and the effect itself. Most everyone is familar with the change of state of water, i.e., melting and boiling. But when water is replaced with other chemicals, a change of state occurs with which people are not so familar. If such a change of state can then be effectuated in an unusual fashion, a novelty effect is created with respect to the change of state which in addition to is novel effect functions as an excellent teaching tool.

It is therefore the principal object of this invention to provide an educational toy which illustrates a change of state to produce a novelty effect.

It is another object of this invention to provide a novelty toy which illustrates heat transfer along a metal rod to produce a novelty effect.

It is a further object of this invention to provide an educational toy which is illustrative of crystal formation.

It is a still further object of this invention to provide an educational toy which is illustrative of a change of state while providing an aesthetic effect.

These and other objects and advantages of the present invention will become apparent upon the following detailed description taken in conjunction with the accompanying drawings.

SUMMARY OF THE INVENTION

Briefly the invention consists of a sealed container substantially filled with a liquid having a freezing point of below room temperature and a heat conductive metal rod, one end of which communicates with the liquid within the sealed container, while the other end extends from the sealed container and is adapted for contact with ice or the like so that upon melting of the ice the rod is cooled causing crystallization of the liquid within the sealed container.

IN THE DRAWINGS

Figure 1:
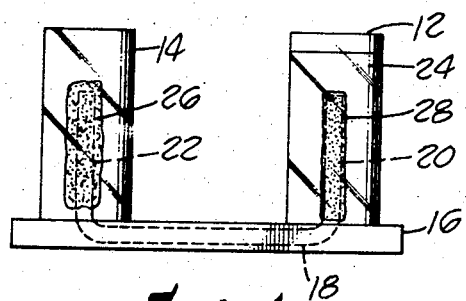
FIG. 1 is a side elevation the first embodiments showing an open and a closed cylinder with the heat conductive rod extending therebetween.

Referring now in detail to the drawings, the first embodiment of the educational toy 10 is shown in FIG. 1 and comprises a first cylinder 12 and a second cylinder 14 mounted on a base 16. A U-shaped heat conductive rod 18 is mounted within base 16, one arm 20 of rod 18 extending upwardly into cylinder 12 while the other arm 22 of the U-shaped rod extends upwardly into cylinder 14. Cylinder 12 is a sealed cylinder constructed of a clear plastic material or the like and is substantially filled with a non-toxic liquid 24 having a melting point generally less than room temperature. While the toy is operable in the general range of 32° to 85° Fahrenheit, the preferred melting point is generally at or just below room temperature, which ranges from about 70° to 75° Fahrenheit. Thus a liquid with a melting point in the nature of about 75° Fahrenheit is preferred. l-dodecyl alcohol and T-butyl alcohol are examples of such liquids. Other alcohols and ethers such as phenyl ethers could be used. l-dodecyl alcohol is a good choce of liquid for use in the educational toy 10, because in addition to having the desired temperature for a melting point, it is non-toxic, has a high boiling point and is of low flamability, making it safe for children as well as adults. Cylinder 14 is also constructed of a clear plastic material or the like and is open at its upper end. The base 16 is constructed of a thermal plastic material to prevent heat transfer to the portion of the U-shaped heat-conducting rod 18 which is mounted within the base. In use, an ice cube 26 is placed about upstanding arm 22 of the rod 18. As the ice cube melts, it draws heat from the rod, cuasing a local temperature drop within upstanding arm 22. Due to the relatively high heat conductivity of the rod, the temperature throughout the rod including upstanding arm 20 in cylinder 12 also drops, causing the liquid 24 in immediate contact therewith to freeze thereby forming crystals 28 about the upstanding arm 20. As the melting continues, so does the crystallization, giving the appearance that the ice cube 26 about arm 22 has moved from cylinder 14 to cylinder 12. Eventually all of the liquid within the sealed cylinder will be crystallized whereupon the solidified alcohol or ether need only be brought to a temperature above its melting point [about 75° F.] and the effect can be redemonstrated. Raising the temperature of the liquid 24 can be caused by placing the toy 10 in a heated atmosphere, rubbing the cylinder 12 to heat the liquid therein by friction or by heating the rod 18 either by a direct application of heat to the exposed end 22 in open cylinder 14 or by activating a heating coil [not shown] which could be placed in contact with the heat conducting rod 18. It should also be noted that water and ice could be substituted for the form fitting ice cube 26 in cylinder 14 to effectuate the crystallization about upstanding arm 20 in cylinder 12. The use of the single formed cube, however, is preferred to more relistically simulate the transfer of the ice cube from cylinder 14 to cylinder 12. It may also be desirable to utilize a hollow heat transfer rod 18, filling the central channel thereof with the same liquid 24 used in closed cylinder 12, thereby precipitating the crystal formation about upstanding arm 20 by providing a base for crystal growth in closer prximity to ice cube 26. It should also be noted that constructing the U-shaped rod 18 of aluminum provides excellent adhesion between the formed crystals and the rod, further enhancing the transfer effect.

Figure 2:
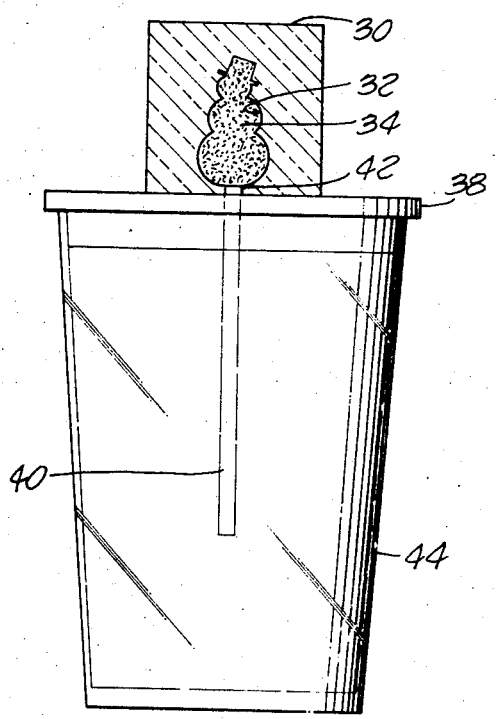
FIG. 2 is a side elevation of a second embodiment of the invention having a liquid-filled cavity in the form of a snowman.
Figure 3:
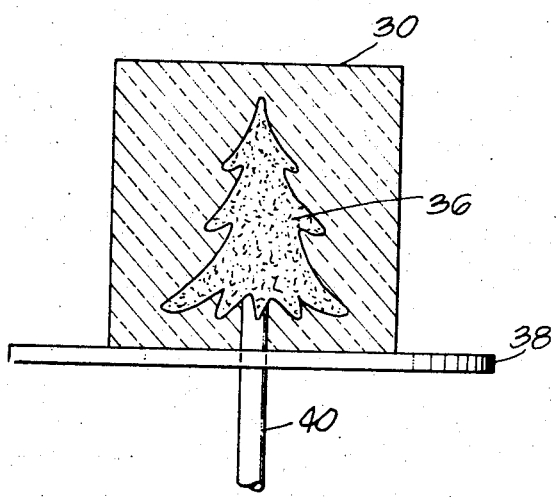
FIG. 3 is a side elevation of the second embodiment wherein the cavity is in the form of a tree.

A second embodiment of the invention is shown in FIGS. 2 and 3. In this form of the invention, a translucent block 30 has an interior chamber 32 therein. In FIG. 2 the chamber is shown in the form of a snowman 34, while in FIG. 3, the chamber is shown in the form of a tree 36. In each case, the chamber is substantially filled with 1-dodecyl alcohol or T-butyl alcohol or other liquids having the chemical characteristics set forth in the discussion of the first embodiment of the invention. The block 30 is mounted on a thermal plastic or other heat insulating base 38. A heat conducting rod 40 extends from chambers 32, as shown in FIGS. 2 and 3. The rod can extend into the chamber as shown in FIG. 3 or terminate at the base 42 thereof as seen in FIG. 2. In use, the base 38 atop a conventional drinking glass 44, the glass being filled with ice and water or an iced drink. As the heat conductive rod cools crystallization begins to form about the upper end of the rod in chamber 32. After a short time, all of the liquid within chamber 32 crystallizes forming a white figure within translucent block 30. In the device of FIG. 2, a snowman would be seen to appear, while in FIG. 3, a snow-covered tree. It should be noted that non-toxic coloring which would not effect the melting point of the alcohol or ether within the chamber could be added to provide a coloring effect if so desired. It should be noted in conjunction with this embodiment, that if the refractive index of the block 30 could be matched by the refractive index of the liquid in the interior chamber, the chamber would not be visible prior to crystallization, which would further enchance and broaden the novelty effect and teaching potential of the toy.

Figure 4:
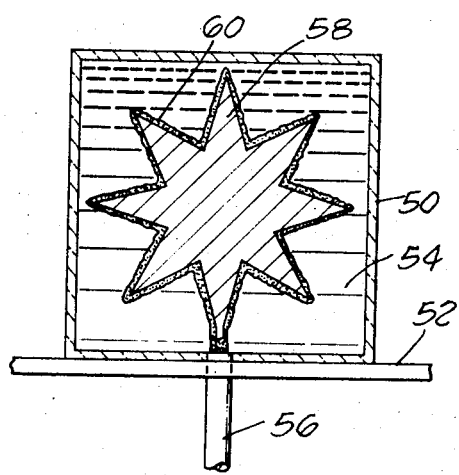
FIG. 4 is a side elevation of a third embodiment of the invention showing the end of the heat-conductive rod terminating in a star configuration within a hollow container.

A third embodiment of the invention is shown in FIG. 4. In this form of the invention a translucent house 50 is mounted on a heat insulated base 52. The housing defines an interior chamber 54 which is substantially filled with the suitable alcohol or ether, as defined in the first embodiment. A heat conductive rod 56 communicates with interior chamber 54 and terminates in an aesthetic design, a star 58 being shown in FIG. 4. The third embodiment is then used as the second, wherein the base 52 is placed over a glass containing an iced drink or the like. The rod cools and crystallization 60 begins to form about a metal figure 58.

Figure 5:
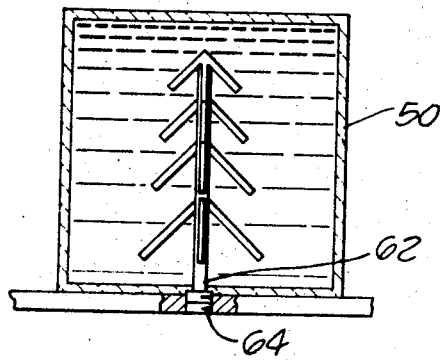
FIG. 5 is a side elevation of a forth embodiment of the invention wherein the heat conductive rod is hollow.

A variation of the third embodiment is shown in FIG. 5, wherein the formed heat conductive rod 62 is hollow and adapted to receive cold water or the like therein. A stop 64 is provided at the lower end of formed rod 62 to seal the cold water therein. The water within the formed rod cools the rod causing crystallization to occur on the exterior of the rod, thereby presenting an attractive design within housing 50 while illustrating the phenomenon of change of state.

Various changes and modifications may be made in carrying out the present invention without departing from the scope and spirit thereof. Insofar as these changes and modifications are within the purview of the appended claims they are to be considered as part of the invention.

What is claimed is:

1. An educational toy comprising a translucent housing having an interior chamber therein, said chamber being substantially filled with a liquid having a melting point within the range of 32 to 85 degrees Fahrenheit and a metal rod communicating with said chamber and extending therefrom, the extended end of said rod being adapted to be placed in a cold environment causing heat transfer along said rod and crystallization within said interior chamber.

2. The combination of claim 1 wherein said melting point is within the range of about 60° to 80° Fahrenheit.

3. The combination of claim 1 wherein said melting point is about 75° Fahrenheit.

4. The combination of claim 1 wherein said housing is mounted on a base constructed of a thermal insulating material and said liquid is taken from the group of ethers and alcohols having a low toxicity and a melting point within the range of about 60° to 80° Fahrenheit.

5. The combination of claim 4 wherein said interior chamber defines an object naturally covered by snow so that upon complete crystallization of said liquid within said chamber said snow covered object appears within said housing.

6. The combination of claim 5 wherein said liquid has a melting point of about 75° Fahrenheit.

7. An educational toy comprising a translucent housing mounted on a base constructed of a thermal insulating material, said housing having an interior chamber therein, said chamber defining an object naturally covered by snow and being substantially filled with a liquid of low toxicity and having a melting point of about 75° Fahrenheit, and a metal rod communicating with said chamber and extending therefrom through said base, the extended end of said rod being adapted to be placed in a cold environment causing heat transfer along said rod and crystallization of said liquid within said chamber so that upon complete crystallization of said liquid within said chamber, said snow covered object appears within said housing.

8. The combination of claim 7 wherein said base is adapted to support said toy atop a conventional drinking glass, said rod extending into the interior of said glass, so that upon said glass being filled with an iced drink, said drink constitutes said cold environment.

9. The combination of claim 7 wherein said liquid is T-butyl alcohol.

10. The combination of claim 7 wherein said liquid is l-dodecyl alcohol.

11. The combination of claim 7 wherein said rod is constructed of aluminum.

12. An educational toy comprising a translucent housing mounted on a base constructed of a thermal insulating material, the interior of said housing being substantially filled with a liquid having a melting point within the range of 32° to 85° Fahrenheit and a metal rod, one end of said rod extending into the interior of said housing and defining an object therein, the other end of said rod extending from said rod extending from said housing through said base and being adapted to be placed in a cold environment causing heat transfer along said rod and crystallization about the outer surface of said rod within said chamber.

13. The combination of claim 12 wherein said melting point is within the range of about 60° to 80° Fahrenheit.

14. The combination of claim 12 wherein said melting point is about 75° Fahrenheit.

15. The combination of claim 14 wherein said base is adapted to support said toy atop a conventional drinking glass, said rod extending into the interior of said glass so that upon said glass being filled with an iced drink, said drink constitutes said cold environment.

16. An educational toy comprising a translucent housing, the interior of said housing being substantially filled with a liquid having a melting point within the range of 32° to 85° Fahrenheit, a hollow metalic object positioned within the interior of said housing and having an open end communicating with the exterior of said housing, said object being adapted to be filled with cold water or the like and means for sealing the open end of said object so that upon sealing the cold water or the like within the metal object, heat transfer occurs through the object causing crystallization to occur on the outer surface thereof.

17. The combination of claim 16 wherein said melting point is within the range of about 60° to 80° Fahrenheit.

18. The combination of claim 16 wherein said melting point is about 75° Fahrenheit.

19. An educational toy comprising a closed translucent housing mounted on a base constructed of a thermal insulating material, said housing being substantially filled with a liquid having a melting point within the range of 32° to 85° Fahrenheit, a second open housing mounted on said base and a metal rod carried by said base and thermally communicating the interior of said closed housing with the interior of said open housing, so that upon placing ice or the like in said open housing, heat transfer occurs along said rod, causing crystallization of said liquid in said closed housing about the outer surface of the portion of said rod communicating with the interior of said closed housing.

20. The combination of claim 19 wherein said melting point is within the range of about 60° to 80° Fahrenheit.

21. The combination of claim 19 wherein said melting point is about 75° Fahrenheit.

22. The combination of claim 21 wherein said rod is constructed of aluminum.

23. The combination of claim 19 wherein said metal rod is U-shaped, one arm of said rod extending into said open housing and the other arm of said rod extending into said closed housing so that upon placing ice in said open housing about the arm of the rod therein, crystallization of said liquid in said closed housing occurs about the arm therein.

24. The combination of claim 23 wherein said melting point is within the range of about 60° to 80° Fahrenheit.

25. The combination of claim 23 wherein said melting point is about 75° Fahrenheit.

26. The combination of claim 25 wherein said rod is constructed of aluminum.

* * * * *